Oct. 17, 1950 — P. W. GARBO — 2,525,790
FLUIDIZING PROCESS FOR ZINC RECOVERY
Filed Feb. 12, 1948 — 2 Sheets-Sheet 1

INVENTOR
Paul W. Garbo

Oct. 17, 1950  P. W. GARBO  2,525,790
FLUIDIZING PROCESS FOR ZINC RECOVERY
Filed Feb. 12, 1948  2 Sheets-Sheet 2
Fig. 2
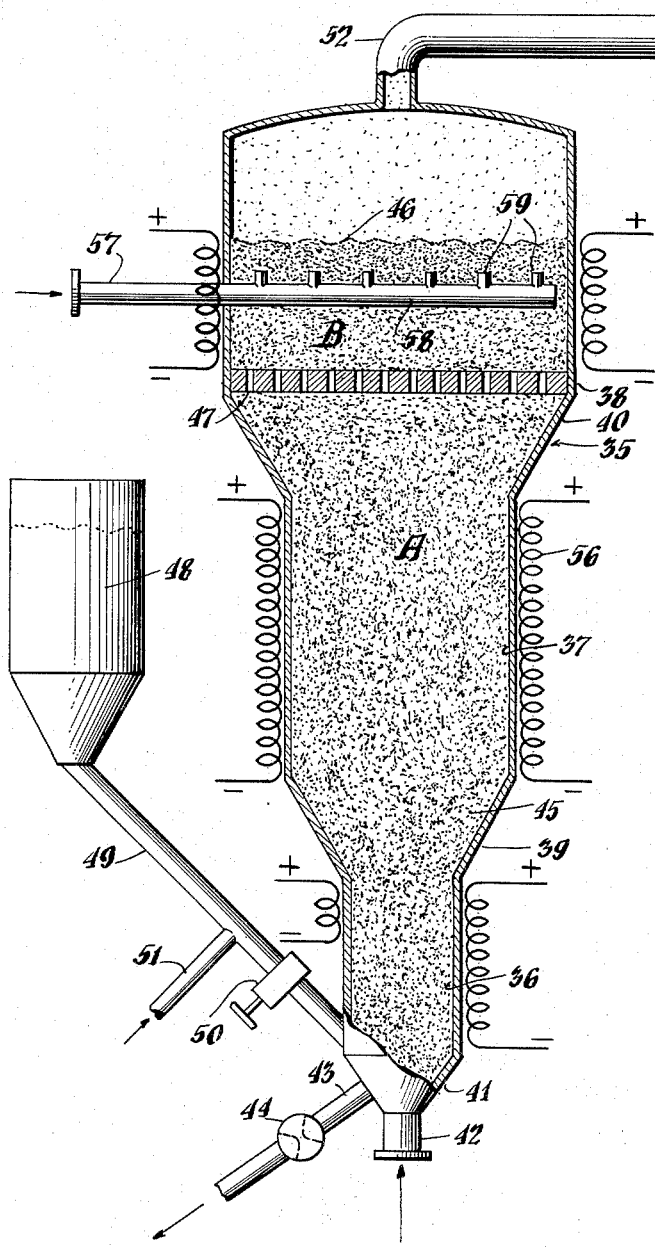
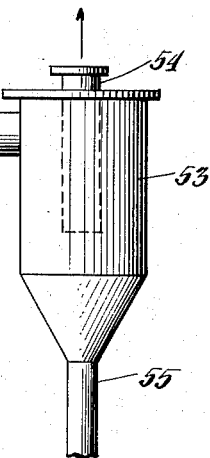
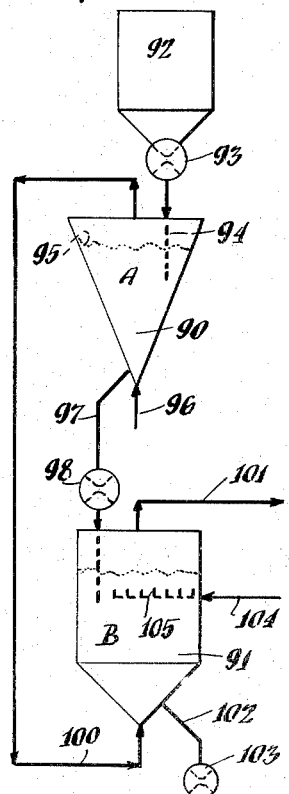
Fig. 4
INVENTOR
Paul W. Garbo Patented Oct. 17, 1950

2,525,790

UNITED STATES PATENT OFFICE 2,525,790

FLUIDIZING PROCESS FOR ZINC RECOVERY

Paul W. Garbo, Freeport, N. Y., assignor to The American Metal Company, Limited, New York, N. Y., a corporation of New York Application February 12, 1948, Serial No. 7,736

12 Claims. (Cl. 75—26)

This invention pertains to a fluidizing process for producing zinc by the reduction of comminuted zinc compounds, such as the oxide and the silicate of zinc, and, more particularly, to a process discharging a gaseous stream containing zinc vapor from which the zinc can be condensed with little or no formation of blue powder.

A major problem of the zinc industry is that of condensing the zinc vapor contained in the gaseous effluent from the reducing retort or reactor without forming a large proportion of undesirable blue powder (superficially oxidized zinc). Currently, about 20% of the zinc collected in the condensers is in the form of blue powder which is returned to the reducing retorts for reprocessing. It is obvious that this recycling of zinc powder to obtain molten zinc constitutes a substantial fraction of the cost of producing zinc by conventional methods.

Much research has been directed to finding a solution for this troublesome problem and while several schemes for condensing zinc without forming blue powder have been advanced, none has found acceptance in commercial practice. To my knowledge, the Maier proposal has received most attention; this proposal involves adding methane to a gaseous stream containing zinc vapor and carbon dioxide and/or water vapor and passing the gaseous mixture through a bed of catalyst particles maintained at a temperature of the order of 2000° F. or higher to promote the reactions:

$$CO_2 + CH_4 \rightarrow 2CO + 2H_2$$
$$H_2O + CH_4 \rightarrow CO + 3H_2$$

and thus permit the subsequent condensation of zinc to proceed with little formation of blue powder. However, from the point of view of commercial operation, the Maier proposal is unattractive for three principal reasons. First, the catalyst required by Maier involves an initial expense and a recurring expense for reactivating or replacing the spent catalyst. Second, the foregoing reactions occuring in the catalytic bed are endothermic so that heat must be supplied thereto; since the walls of the vessel holding the catalytic bed must function as heat transfer surfaces at temperatures well above 2000° F., the construction of the vessel is a serious problem in itself. Third, satisfactory operation of Maier's process depends critically on adding only a stoichiometric quantity of methane to the reaction gases containing carbon dioxide and/or water vapor to reduce these oxidizing components. Any excess of methane eventuates in the deposition of carbon on the catalyst because unreacted methane is cracked on passing through the catalyst zone maintained at a temperature of about 2000° F. or higher. Carbon deposition not only interferes with the desired catalysis but also leads to plugging of the catalyst bed.

A primary object of this invention is to provide a simple process for producing zinc substantially free of blue powder.

Another important object is to avoid the use of expensive catalysts to decrease the content of undesirable carbon dioxide and/or water vapor in a gaseous stream containing zinc vapor prior to the condensation of the zinc.

Additional objects and advantages of my invention will become apparent from the description which follows.

For the purposes of this invention, the term, zinc compound, embraces the oxide, hydroxide, silicate and carbonate of zinc since these zinc compounds are readily reduced to metallic zinc. Generally, however, the oxide form of zinc is charged to the reducing zone. The most prevalent type of mineral or ore contains zinc as a sulfide which is roasted to the oxide form prior to reduction for the recovery of metallic zinc. Typical of sulfide type ores is sphalerite, the sulfide of zinc. A lower grade ore or mineral is marmatite, a double sulfide of zinc and iron, which when found substantially free of richer zinc minerals is considered too lean in zinc for economic working by conventional processes of reduction. After roasting, these ores contain not only the oxides of zinc and iron but other natural occurring contaminants. The process of the present invention is well suited for the reduction of zinc compounds having such impurities associated therewith. It is understood that the minerals or ores which are to be treated for the recovery of zinc are usually concentrated by jigging, flotation, etc., but these ore concentrates in general still have an appreciable content of impurities.

Broadly, the invention involves conducting the reduction of comminuted zinc compounds while maintained in a fluidized bed and introducing a hydrocarbon stream into the fluidized bed in the vincinity of its upper end. The hydrocarbon stream which may be gas oil, naphtha, butane, propane and preferably methane reacts upon entering the fluidizied mass with the small but nevertheless troublesome proportion of oxidizing gases, namely, carbon dioxide and water vapor, present in the reaction gases passing up through the fluidized mass. As a result, the reaction gases leave the fluidized mass with a substantially decreased proportion of oxidizing gases so that the zinc vapor can be condensed therefrom with little or no formation of blue powder.

Preferred embodiments of my invention will be set forth more specifically in conjunction with the accompanying drawings, of which:

Figure 2 is a schematic sectional elevation of a two-stage reactor in which the invention may be carried out;

Figure 3 is a diagrammatic representation of a plurality of vessels arranged in a manner to permit the conduct of the process of this invention; and Figure 4 is a diagrammatic showing of another arrangement of equipment adapted for the process of my invention.

Figure 1:
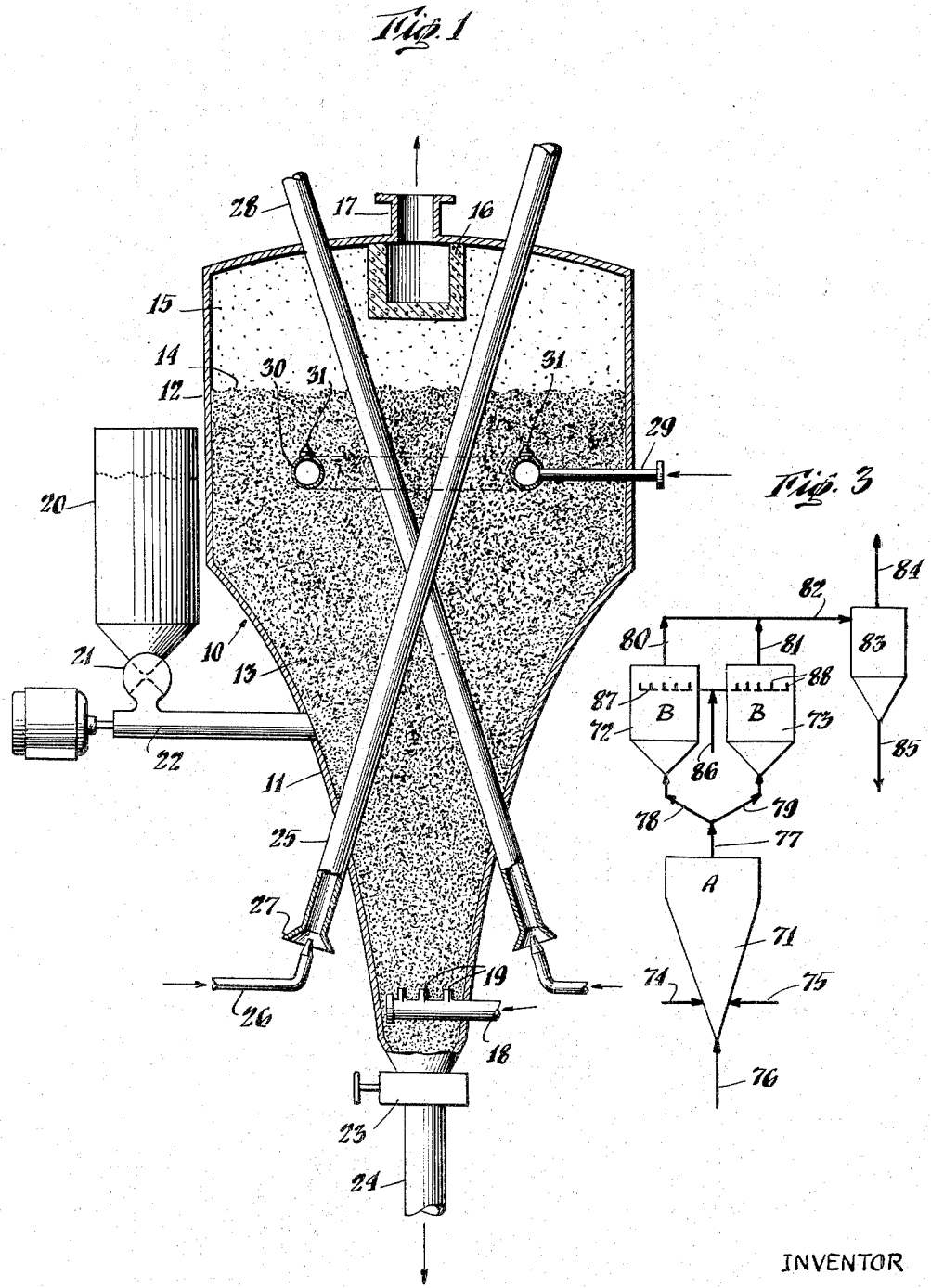
Figure 1 is a schematic sectional elevation of a reactor suitable for my purposes.

Referring to Figure 1, a reducing vessel 10 comprises a lower flared section 11 and an upper straight section 12 contains a fluidized bed 13 having an upper pseudo-liquid level 14. In operation, the reaction gases passing through vessel 10 emerge from the fluidized mass 13 in the region of pseudo-liquid level 14 and ascend through space 15 wherein particles entrained by the gases tend to settle out. Filter element 16 is interposed between the settling space 15 and outlet 17 so that the reaction gases may be withdrawn free of suspended particles. To support fluidization, particularly in the lower portion of the bed 13, an inert gas such as nitrogen or zinc vapor or a reducing gas such as carbon monoxide or methane is introduced through pipe 18 and nozzles 19. A mixture of finely divided zinc compound and a solid reducing agent such as pulverized coke is fed from hopper 20 by way of feeder 21 and screw conveyor 22 into the upper portion of the fluidized bed 13. The reducer 10 is provided at its lower extremity with a slide valve 23 through which reacted solids are withdrawn by way of pipe 24. To maintain the fluidized mass 13 at the desired reducing temperature, a plurality of fire-tubes 25, uniformly distributed around the vessel 10 and passing obliquely therethrough to expose a greater length of heat surface, are charged with a fluid fuel such as natural gas or fuel oil through injectors 26 which cooperate with Venturi-like openings 27 for the aspiration of air to support combustion within the tubes 25. The combustion or flue gases leave these tubes through the upper ends 28, discharging into the atmosphere or a suitable stack.

In accordance with this invention, a hydrocarbon stream, say natural gas of about 90% methane content, is charged through inlet pipe 29 and distributor ring 30 having a plurality of nozzles 31. The hydrocarbon stream thus enters the fluidized mass 13 at a level such that it remains in the fluidized mass 13 for a period of the order of 1 to 6 seconds. The fluidized mass 13 ensures rapid and uniform admixture of the hydrocarbon stream issuing from nozzles 31 with the reaction gases rising through the reducer 10. The hydrocarbon stream quickly reacts to decrease the presence of carbon dioxide, and water vapor if present; since the reaction is endothermic, it is facilitated by the fluidized mass 13 which is readily maintained at the desired reaction temperature.

The combined reaction gases containing not more than about 0.5% by volume of carbon dioxide and water vapor, preferably not more than about 0.1%, emerge from the fluidized mass 13 at pseudo-liquid level 14, pass through space 15, filter 16 and outlet 17, and flow into a condenser (not shown) wherein the zinc vapor contained in the reaction gases is condensed substantially without the formation of blue powder.

In Figure 2, the reducer 35 comprises a plurality of cylindrical sections 36, 37 and 38 of increasing diameters connected by frusto-conical sections 39 and 40. The lowermost cylindrical section 38 terminates in a tapered section 41 connecting with inlet pipe 42 for the introduction of a small stream of fluidizing gas. Attached to the tapered section 41 is a draw-off pipe 43 having valve 44 for the withdrawal of solids to permit cleaning or repairing of the apparatus. The fluidized mass 45 having an upper pseudo-liquid level 46 is divided by perforated plate 47 into a lower portion A to serve as the first stage of the reduction and an upper portion B for the second stage of the reduction. The perforations in plate 47 permit the flow of reaction gases and fluidized solids to pass from the first stage to the second stage of reducer 35 and prevent the solids in the second stage or portion B of the fluidized mass from dropping back into the first stage or portion A of the fluidized mass. Accordingly, the reaction gases and fluidized solids move concurrently from the first stage to the second stage of the reducer 35. Hopper 48 is used for charging a mixture of finely divided zinc compound and carbon or like reducing agent into the first stage of the reducer 35. Hopper 48 discharges into portion A of the fluidized mass through standpipe 49 and slide valve 50. A connection 51 is used to introduce a small quantity of gas, say carbon monoxide, or air, to keep the solids in line 49 in a free-flowing condition. The reacted solids are conveyed by entrainment in the reaction gases leaving reducer 35 by way of outlet pipe 52. The reaction gases and suspended particles enter cyclone separator 53 wherein the gases and solids are separated, the gases leaving by way of outlet 54 and the solids flowing out of standpipe 55. The reaction gases emerging from outlet 54 pass to a suitable condenser for separating the zinc vapor from the remainder of the gaseous effluent issuing from outlet 54. In this instance, the necessary heat for the reduction of the zinc compound is furnished by electrical resistance heaters 56.

Since the reaction gases leaving portion B of the fluidized mass would normally contain such a proportion of carbon dioxide that appreciable blue powder would be formed in condensing the zinc vapor in the reaction gases, this difficulty is corrected pursuant to this invention by injecting a hydrocarbon stream into the upper part of portion B of the fluidized mass by way of inlet 57, distributor 58 and nozzles 59. The reaction of the hydrocarbon stream with the reaction gases of the reduction prior to the disengagement of these gases from the fluidized mass leads to the disappearance of carbon dioxide to an extent that the gases can then be cooled to condense the contained zinc vapor without forming more than just traces of blue powder.

Figure 3 shows an arrangement of three vessels 71, 72 and 73 wherein the fluidized mass is maintained in two portions A and B. The portion A in tapered vessel 71 acts as the first stage of the reducing equipment and communicates through line 77 and branches 78 and 79 with portion B disposed in cylindrical vessels 72 and 73. Because of the relatively high velocity of the gases passing through lines 77, 78 and 79, the solids can only move from portion A to portion B of the fluidized mass. Line 74 is used for introducing a finely divided zinc compound and line 75 serves for the introduction of comminuted coke or like reducing agent. A relatively small quantity of fluidizing gas such as carbon monoxide enters vessel 71 through line 76. The reaction gases and reacted solids suspended therein pass from vessels 72 and 73 through lines 80 and 81, respectively, to the manifold line 82 which in turn discharges into separator 83. The reaction gases including zinc vapor leave separator 83 through line 84 and the reacted solids or residue of the two-stage reduction operation flow out of line 85. It will be observed that vessels 72 and 73, which are arranged in parallel, function together as a single vessel of larger diameter that might be used for the second stage of the reducing process.

In commercial operation, the composition of the fluidized solids in portion B, i. e., in vessels 72 and 73, is such that chemical reactions are still proceeding in accordance with the following equations:

(A)     $ZnO + CO \rightarrow Zn + CO_2$
(B)     $CO_2 + C \rightarrow 2CO$ as the reaction gases leave the fluidized mass. Analysis of the gaseous effluent discharging from line 84 reveals that the carbon dioxide content usually falls in the range of about 3 to 6% by volume; such content of carbon dioxide causes the formation of an appreciable quantity of blue powder during the condensation step. This evidence indicates that reaction (B) is a little slower than reaction (A). To correct this undesirable situation, a hydrocarbon fluid is fed through line 86 to distributors 87 and 88 whence the fluid escapes and contacts the fluidized mass in vessels 72 and 73, respectively. Thereupon, the injected hydrocarbon fluid reduces the carbon dioxide to carbon monoxide substantially completely so that the condensation of the zinc vapor in the gaseous effluent discharging from line 84 is essentially trouble-free.

Figure 4 presents an arrangement of reducing equipment comprising a tapered vessel 90 and a cylindrical vessel 91. Vessel 90 holds portion A of the fluidized mass in which the first stage of reduction is effected and vessel 91 holds portion B of the fluidized mass for the second stage of the reduction. A mixture of zinc compound and solid reducing agent in powdered form flows from hopper 92 through rotary-type valve 93 into standpipe 94 discharging below the pseudo-liquid level 95 of portion A of the fluidized mass. A limited quantity of fluidizing gas is introduced into the bottom of tapered vessel 90 by way of line 96. The reaction gases from the first stage of reduction pass through line 100 into vessel 91 wherein the second stage of the reduction is carried out. The final reaction gases including zinc vapor are withdrawn from vessel 91 by way of outlet pipe 101 and conducted to a condenser for the recovery of molten zinc. The partially reacted solids flow from vessel 90 through standpipe 97, controlled by a valve 98, and discharge below the pseudo-liquid level 99 of portion B of the fluidized mass within vessel 91. The reacted solids leave the second stage of the reducing equipment through line 102 and control valve 103. The arrangement of reducing equipment shown in Figure 4 is advantageously used where the zinc compound to be reduced is in the form of a material which tends to agglomerate during reduction. In such a case, the agglomerates will readily pass with the fluidized mass from vessel 90 or the first stage of reduction to vessel 91 or the second stage of the reduction and the residue of the operation can be easily withdrawn through line 102 at the bottom of vessel 91.

Pursuant to the teachings of this invention, the usual formation of blue powder in condensing the zinc vapor contained in the gaseous effluent from outlet 101 is corrected by introducing a hydrocarbon stream through inlet 104 and distributor 105 into the fluidized mass in vessel 91.

Since Figures 3 and 4 are diagrammatic representations of reducing equipment suitable for the practice of my invention, means, such as firetubes, electric arcs or resistance heaters, to provide heat for the endothermic reducing reaction have not been shown.

A specific example of the process of the invention will be given in terms of a reactor of the type shown in Figure 1. The vessel 10 is 2.3 feet in diameter at the point where zinc vapor is fed through pipe 18 and nozzles 19 and is 9.3 feet in diameter within the straight section 12. The fluidized mass 13 is 34 feet in depth. Fifty firetubes 25 of 4-inch diameter are uniformly spaced around the axis of vessel 10 in a four-ring arrangement. Natural gas is burned with air within tubes 25 to maintain the fluidized mass 13 at a reaction temperature of 1840° F. A mixture of impure zinc oxide (weight analysis of ZnO 78.5%, ZnS 1.5%, $ZnSO_4$ 2.2%, $Fe_2O_3$ 10.0%, PbO 2.8% and the remainder comprising the oxides of copper, cadmium, manganese, magnesium, calcium and silicon) and coke in the proportions of 3 lbs. of impure zinc oxide per pound of coke and in the form of a powder passing through a 60-mesh screen (40% thereof passing through a 325-mesh screen) enters the reducing zone by way of screw conveyor 22 at the rate of 4295 lbs. per hour. Under the selected reaction conditions and with the increase of horizontal cross-section in vessel 10, an average gas velocity of about 0.5 foot per second is established. With the introduction of 146 lbs. per hour of zinc as vapor and 800 cubic feet (standard conditions) per hour of carbon monoxide through pipe 18, the reaction gases discharging from outlet 17 contain 45.1% by volume of zinc vapor. The reaction gases also include 3.4% by volume of carbon dioxide and 0.9% by volume of water vapor. When these gases are cooled to condense the zinc vapor, about 7½% of the total zinc produced (2000 lbs. per hour) is recovered in the form of blue powder. Because of the unusually favorable reaction conditions selected for this operation, the proportion of blue powder is from about ½ to ⅓ of that generally realized in current commercial processes.

However, in spite of these seemingly good results, I have found that the formation of blue powder can be substantially completely eliminated.

For this purpose, in the case of the specific example, I introduce 2260 cubic feet (standard conditions) per hour of methane through inlet 29, distributor 30 and nozzles 31 into the fluidized mass 13 at a level about 2 feet below the pseudo-liquid level 14. Under these circumstances, the gaseous effluent is found to contain only 0.1% by volume of carbon dioxide and water vapor. The zinc vapor is now recoverable as molten metal with less than 1% forming blue powder.

Alternatively, I introduce 15.5 gallons per hour of a cracked Mid-Continent gas oil (40.3° A. P. I. and 0.2% sulfur content) through inlet 29 in lieu of the 2260 cubic feet per hour of methane and substantially the same improved results in the condensation of the zinc vapor are obtained as noted with the introduction of methane.

It will be observed that zinc vapor constituted about ½ (on the mol basis) of the fluidizing medium fed through pipe 18. The use of zinc vapor as fluidizing medium in a reducing operation to avoid dilution of the zinc vapor produced is fully described and claimed in my copending application Serial No. 770,590, filed August 26, 1947, and now Patent 2,475,607 of July 12, 1949.

While the quantity of hydrocarbon gas or liquid which is to be injected into the upper part of a fluidized mass undergoing reduction to produce zinc will vary with the reaction conditions and is determinable by simple exploratory trials, some helpful guides to the practice of my invention are offered. The quantity of hydrocarbon is at least stoichiometrically sufficient to reduce all of the oxidizing gases, carbon dioxide and water vapor, in the reaction gases to carbon monoxide and hydrogen. More generally, about 150% to 300% of the stoichiometric quantity is employed. Where a liquid hydrocarbon is introduced without prior vaporization, the reducing equipment must be designed to provide the additional heat for vaporizing the hydrocarbon.

The hydrocarbon fluid should enter the fluidized reaction mass at a level to ensure its residence therein for a period of about 1 to 6 seconds.

The fluidized reaction mass, at least in the region into which the hydrocarbon stream is charged, should be maintained at a temperature in the range of about 1600° to 2300° F., preferably in the range of about 1800° to 2000° F.

It is well to observe that usually at the temperatures encountered in the reduction of zinc oxide and like compounds some of the hydrocarbon stream introduced in accordance with my invention undergoes cracking or pyrolytic decomposition before it can reduce carbon dioxide and/or water vapor. It appears that the carbon produced by cracking of the hydrocarbon is preferentially deposited on the surfaces of the particles in the fluidized mass. Because of the turbulence of the fluidized mass, this carbon is carried by the particles coated therewith to all parts of the fluidized mass to participate in the reduction process. Accordingly, while more hydrocarbon fluid is generally injected into the fluidized mass than is dictated by stoichiometry for the reduction of the oxidizing gases, the excess is largely consumed usefully in the reduction of zinc oxide or like compound.

In general, it is advisable that the comminuted zinc compound, notably impure zinc oxide obtained by roasting a sulfide type of zinc ore, be supplied to the reducing zone in the form of particles all of which pass through a 60-mesh screen and 20% to 40% of which pass through a 325-mesh screen. The carbon or solid reducing agent, such as coal, charcoal or coke, is usually supplied to the reducer in the form of particles somewhat coarser than the zinc compound particles because of the lower specific density of carbon and consequent tendency of these carbon particles to become fluidized at a gas velocity which will fluidize the finer but denser particles of zinc compound. The average gas velocity through the reducing zone will usually be in the range of about 0.2 to 2.0 feet per second, preferably about 0.4 to 1.5 feet per second. However, all of the foregoing factors may have values larger or smaller than the indicated advantageous ranges, as will be obvious to those skilled in the art.

Since certain changes may be made in carrying out the process hereinabove described without departing from the scope and spirit of the invention, it is intended that all matter contained herein shall be interpreted as illustrative and not in a limiting sense.

What I claim is:

1. In the process of producing zinc by the reduction of a comminuted zinc compound under fluidizing conditions, the improvement which comprises introducing a fluid hydrocarbon stream into the fluidized mass undergoing reduction in the vicinity of the upper end of said fluidized mass to effect substantial diminution in the content of oxidizing components in the reaction gases leaving said fluidized mass, said fluid hydrocarbon stream being additional to material supplied to said fluidized mass as reducing agent for the reduction of said zinc compound, separating said reaction gases from said fluidized mass, and condensing the zinc vapor in the separated reaction gases.

2. The process of claim 1 wherein the fluid hydrocarbon stream is predominantly methane.

3. The process of claim 1 wherein the comminuted zinc compound is predominantly zinc oxide.

4. The process of claim 1 wherein the fluid hydrocarbon stream is within the fluidized mass for a period of about 1 to 6 seconds.

5. The improved process of treating a comminuted solid material containing zinc oxide for the recovery of zinc, which comprises reducing said comminuted material in the presence of a comminuted carbon as reducing agent while disposed in a fluidized bed of increasing horizontal cross-section in the upward direction, intermingling a fluid hydrocarbon stream with the reaction gases in said fluidized bed in the vicinity of the upper end thereof to effect substantial diminution in the content of oxidizing components in said reaction gases, withdrawing said reaction gases from said fluidized bed, and condensing the zinc vapor in the withdrawn reaction gases.

6. The process of claim 5 wherein the fluid hydrocarbon stream is predominantly methane.

7. The process of claim 5 wherein the fluid hydrocarbon stream is within the fluidized bed for a period of about 1 to 6 seconds.

8. In the stagewise process of producing zinc by the reduction of a comminuted zinc compound under fluidizing conditions wherein said zinc compound is passed from the fluidized mass of the first reducing stage to the fluidized mass of at least one succeeding reducing stage, the improvement which comprises injecting a fluid hydrocarbon stream into the fluidized mass of the last reducing stage to effect substantial diminution in the content of oxidizing components in the reaction gases, withdrawing said reaction gases from the fluidized mass of said last reducing stage, and condensing the zinc vapor in the withdrawn reaction gases.

9. The process of claim 8 wherein the fluidized mass of the last reducing stage is at a temperature in the range of about 1600° to 2300° F.

10. The process of claim 9 wherein the fluid hydrocarbon stream is predominantly methane.

11. A process for producing zinc under fluidizing conditions, which comprises introducing zinc oxide and a solid reducing agent into a fluidized bed maintained at reducing temperature to produce zinc in vapor form and introducing a stream of gasiform hydrocarbon into said fluidized bed in the vicinity of the upper end thereof to react with oxidizing components in the reaction gases permeating said fluidized bed, thereby substantially preventing the formation of blue powder during subsequent cooling of said reaction gases to condense zinc therefrom.

12. The process of claim 11 wherein the solid reducing agent is coke and the stream of gasiform hydrocarbon is predominantly methane.

PAUL W. GARBO.

REFERENCES CITED

The following references are of record in the file of this patent:

UNITED STATES PATENTS

| Number | Name | Date |
|---|---|---|
| 1,961,425 | Maier | June 5, 1934 |
| 2,364,742 | Merriam | Dec. 12, 1944 |
| 2,397,352 | Hemminger | Mar. 26, 1946 |
| 2,398,443 | Munday | Apr. 16, 1946 |

FOREIGN PATENTS

| Number | Country | Date |
|---|---|---|
| 445,688 | Great Britain | Mar. 31, 1936 |